US012715177B2

(12) United States Patent
Perrin et al.

(10) Patent No.: US 12,715,177 B2
(45) Date of Patent: Aug. 25, 2026

(54) METHOD AND DEVICE FOR INFRARED WELDING OF POLYMER COMPOSITES

(71) Applicant: LUXEMBOURG INSTITUTE OF SCIENCE AND TECHNOLOGY (LIST), Esch-sur-Alzette (LU)

(72) Inventors: Henri Perrin, Esch-sur-Alzette (LU); Loïc Borghini, Esch-sur-Alzette (LU); Sébastien Klein, Esch-sur-Alzette (LU)

(73) Assignee: LUXEMBOURG INSTITUTE OF SCIENCE AND TECHNOLOGY (LIST), Esch-sur-Alzette (LU)

(*) Notice: Subject to any disclaimer, the term of this patent is extended or adjusted under 35 U.S.C. 154(b) by 144 days.

(21) Appl. No.: 18/861,388

(22) PCT Filed: Apr. 28, 2023

(86) PCT No.: PCT/EP2023/061357
§ 371 (c)(1),
(2) Date: Oct. 29, 2024

(87) PCT Pub. No.: WO2023/209209
PCT Pub. Date: Nov. 2, 2023

(65) Prior Publication Data

US 2025/0289189 A1 Sep. 18, 2025

(30) Foreign Application Priority Data

Apr. 29, 2022 (LU) ....................................... 501976

(51) Int. Cl.
*B29C 65/00* (2006.01)
*B29C 65/14* (2006.01)
*B29C 65/78* (2006.01)

(52) U.S. Cl.
CPC .... *B29C 66/73921* (2013.01); *B29C 65/1412* (2013.01); *B29C 65/1432* (2013.01); *B29C 65/1445* (2013.01); *B29C 65/7841* (2013.01)

(58) Field of Classification Search
None
See application file for complete search history.

(56) References Cited

U.S. PATENT DOCUMENTS 3,483,582 A * 12/1969 Morgan .............. B29C 66/8322 12/142 R
5,151,149 A * 9/1992 Swartz ................ B29C 66/1122 156/499
5,522,954 A * 6/1996 Bennett ............... B29C 65/1412 156/359
5,628,859 A * 5/1997 Janin ........................ H05B 3/10 392/407
12,194,688 B2 * 1/2025 Priem ..................... B29C 65/06

FOREIGN PATENT DOCUMENTS

JP 5117276 A 2/1976

OTHER PUBLICATIONS

International Search Report and Written Opinion for PCT/EP2023/061357, dated Jun. 29, 2023, 10 pages.

* cited by examiner

*Primary Examiner* — Barbara J Musser
(74) *Attorney, Agent, or Firm* — RANKIN, HILL & CLARK LLP

(57) ABSTRACT

A system and a method for infrared welding of two carbon-fibre reinforced thermoplastic workpieces that enables to obtain pieces of better quality and strength. The system removes the heating means and engages the contact between the two workpieces faster.

9 Claims, 2 Drawing Sheets

[Fig 1]
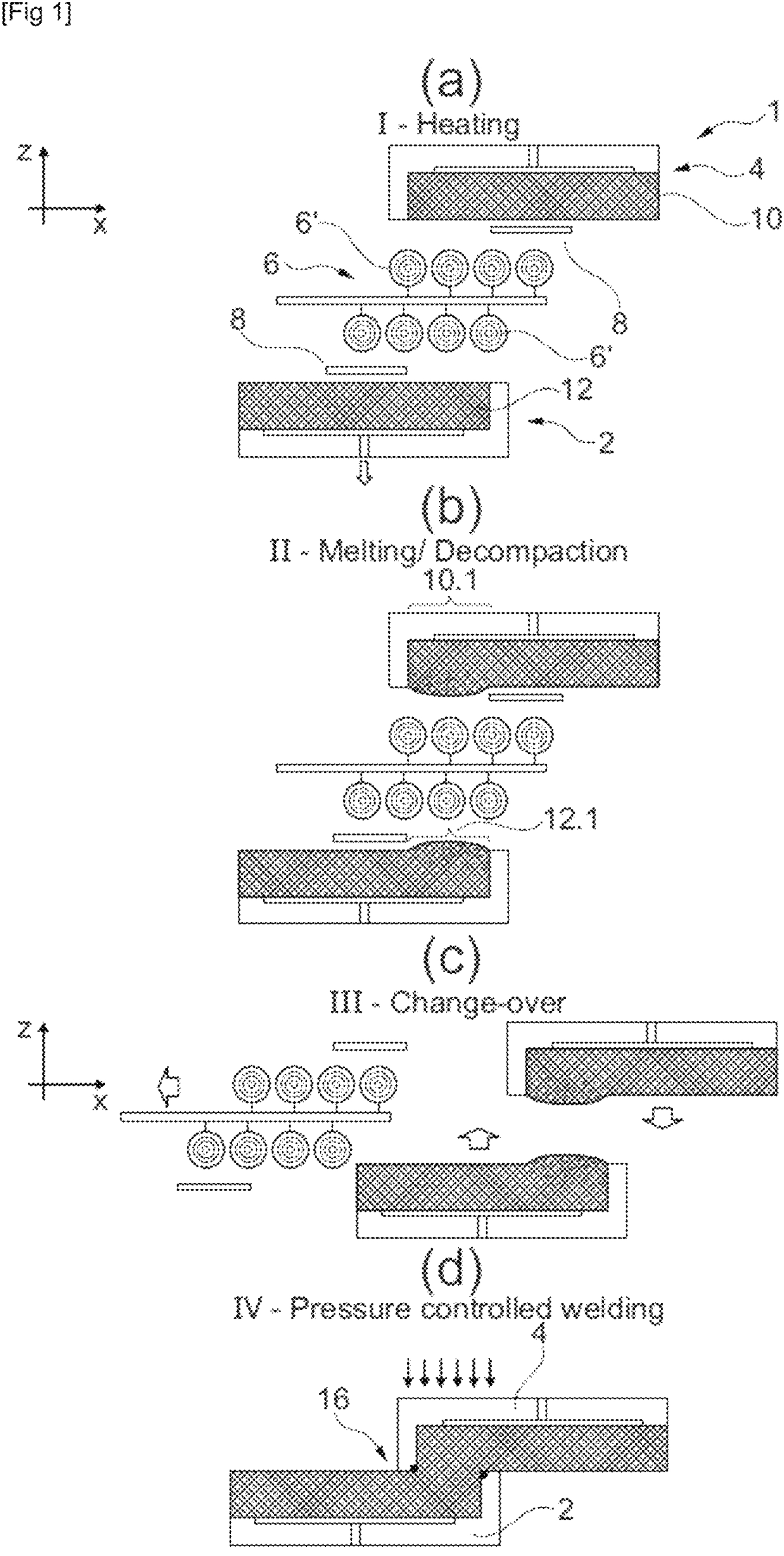

[Fig 2]
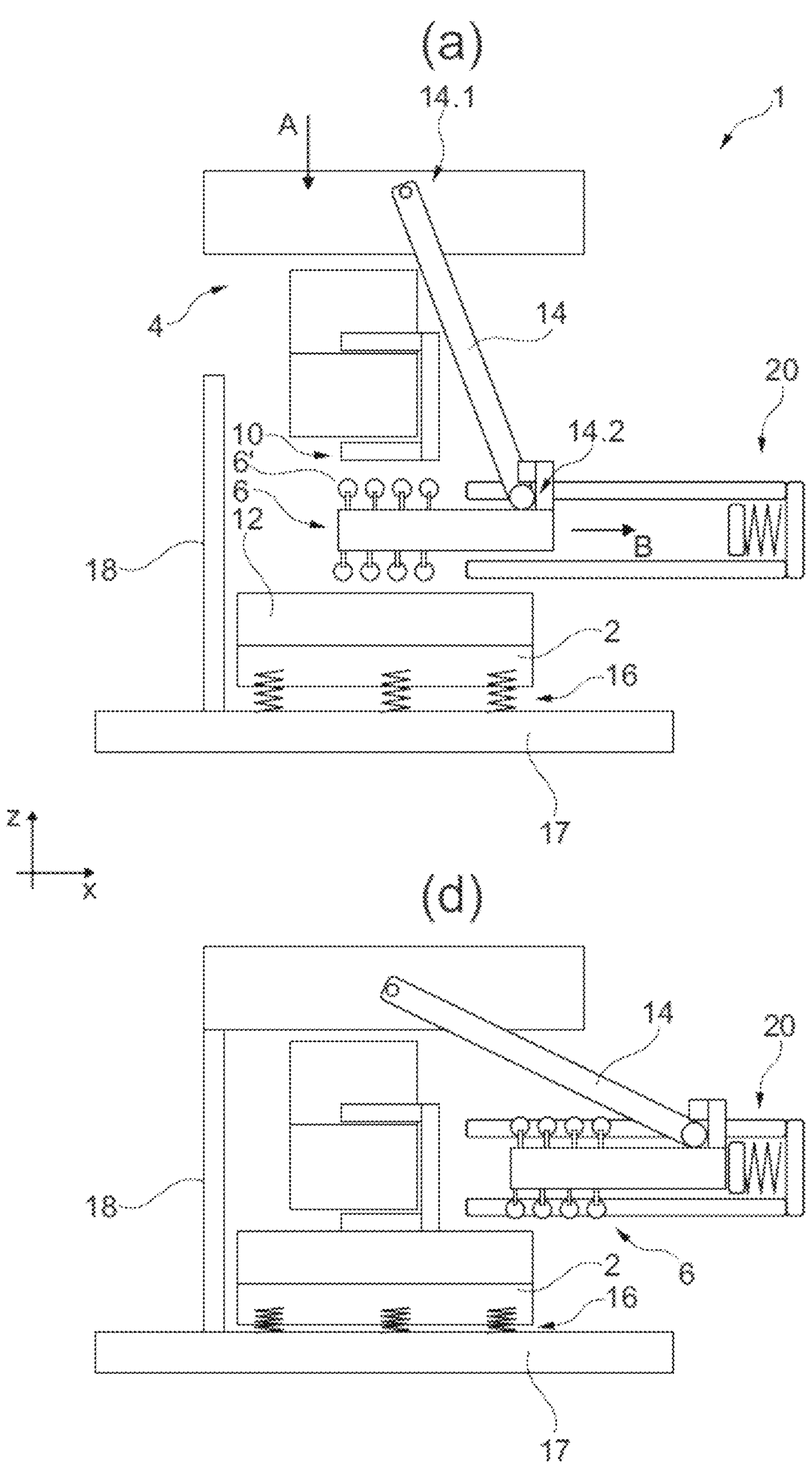

METHOD AND DEVICE FOR INFRARED WELDING OF POLYMER COMPOSITES

TECHNICAL FIELD

The invention relates to the manufacturing process of welding of polymer composites. More specifically, the invention provides a solution for welding polymers by infrared welding.

BACKGROUND ART

Infrared welding is a technique that is adequately used for binding plastic materials together. It consists in placing two workpieces in holders (as in forging dies) and, after radiating with infrared light appropriate portions of the workpieces, to apply a force between the two workpieces to bond them together.

FIG. 1 illustrates such a technique. The system 1 comprises a lower tool 2 and an upper tool 4, the latter being movable vertically (direction z). A heating assembly 6 comprising a series of infrared lamps 6' is movable transversally (along x), together with screens 8 preventing the radiations from the lamps 6' to reach the entirety of the workpieces 10 and 12 to be bonded together.

FIG. 1 shows the four main steps of infrared welding: in step (a), the lamps are switched ON and start to radiate; in step (b) a portion 10.1, 12.1 of the workpieces 10, 12 starts to melt or decompact (and thus increases in width); in step (c) the heating lamps and screens are retracted and in step (d) the tools 2, 4 are brought towards each other to apply a welding pressure.

The retractation of the heating means and the subsequent application of the welding pressure takes around 3 to 5 seconds in the known technique. This corresponds to the incompressible time that is necessary to operate the pneumatic or hydraulic actuators to retract the heating means, the time for the sensors to detect the full retractation of the heating means and for the PLC to confirm that the heating means are retracted, and the time for the upper tool to start its vertical descent.

This known technique however does not suit welding operations of materials with high heat conductivity. For instance, carbon-fibre reinforced thermoplastics (CFRTP) have a heat conductivity (4-7 $W \cdot m^{-1} \cdot K^{-1}$ in fiber direction, 0.5-1 $W \cdot m^{-1} \cdot K^{-1}$ in transversal direction) that is 5 to 10 times higher than the heat conductivity of some other polymers. The variation of temperature through-out the workpiece can significantly impact the structure (porosity, crystallisation rate) of the end product. Due to its high heat conductivity, a CFRTP material heated at 350° C. loses between 3° and 80° C. per second. This means that to ensure that the temperature of the CFRTP is appropriate at the moment when the two workpieces are in contact (i.e., 3 to 5 seconds after heating has stopped), the CFRTP should theoretically be overheated at more than 450° C.

However, overheating is not an option for CFRTP materials because these materials degrade and potentially become crosslinked, thereby preventing them from being weldable thereafter.

There is therefore a need to provide a welding system and a method for welding CFRTP by infrared radiations.

SUMMARY OF THE INVENTION

The invention aims at providing a system and a method which overcome the drawbacks discussed above, and ultimately enable to properly bond by infrared radiations two workpieces of CFRTP, with a bond of high quality.

The invention relates to a system for infrared welding a first workpiece made of carbon-fibre reinforced thermoplastic polymers, CFRTP, to a second workpiece made of CFRTP, the system comprising: an upper tool, for holding the first workpiece, wherein the upper tool is movable in a vertical direction; a lower tool, for holding the second workpiece; a heating assembly comprising infrared heating means and configured to move in a transverse direction between an operative position where the heating means can simultaneously heat a respective portion of the first workpiece and of the second workpiece, and a resting position; and a mechanism configured for moving synchronously the upper tool and the heating assembly, the mechanism comprising: a mechanical connection connecting the upper tool to the heating assembly; and an actuator acting directly on one of the upper tool or the heating assembly, whereas the other one of the upper tool or the heating assembly is moved via the mechanical connection.

With such a system, the time between the end of heating and the moment when the two workpieces contact each other is substantially reduced to about 1.5 second, hence half to three times faster than the known system.

According to an advantageous embodiment, the system further comprises springs to support the lower tool in a vertically movable manner on a vertically fixed support. These springs enable to control the maximum pressure applied between the two workpieces.

According to an advantageous embodiment, the system comprises a stopper for interrupting the downward movement of the upper tool. This stopper enables to control the geometry of the finally product.

According to an advantageous embodiment, the system comprises a damper for dampening the movement of the heating assembly.

According to an advantageous embodiment, the mechanical connection is a rod which forms a pivot connection with the upper tool as well as a pivot connection with the heating assembly. Alternative connections can also be foreseen, such as a chain and pulley assembly, scissor rods with rollers engaging in rails, etc.

The invention also relates to a method for infrared welding a first workpiece made of carbon-fibre reinforced thermoplastic polymers, CFRTP, to a second workpiece made of CFRTP, the method being carried out with a system according to an embodiment described above, the method comprising: heating a respective portion of the first and second workpieces with the infrared heating assembly; synchronously moving: the heating assembly transversally; and the upper tool downwardly.

According to an advantageous embodiment, the system further comprises springs to support the lower tool in a vertically movable manner, such that the welding pressure between the two workpieces resulting from the downward movement of the upper tool is limited by the springs.

According to an advantageous embodiment, the system comprises a stopper and the movement of the heating assembly and of the upper tool stops simultaneously when the upper tool contacts the stopper during its downward motion.

According to an advantageous embodiment, the system comprises a damper and the movement of the heating assembly and of the upper tool is dampened by the damper.

Benefits of the Invention

The several aspects of the invention ensure to various degrees to enable to obtain with infrared welding a carbon-fibre reinforced product of high quality (aeronautics quality standard). The system and method of the invention also allow to obtain robust products of various thicknesses (even above 12 mm thick).

The system enables to reduce the time gap between the end of the heating step and the beginning of the application of welding pressure to about 1.5 seconds. This renders the process faster but more importantly this duration improves greatly the quality of the end product since there is no need to overheat the CFRTP material and a weld joint of better quality ensues.

The system is also reliable and cost efficient, as well as simpler to control as it only requires one actuator to be commanded.

Further benefits may be apparent in relation to the discussion of the figures below.

BRIEF DESCRIPTION OF THE FIGURES

FIG. 1 shows a method according to prior art;

FIG. 2 shows the system of the invention.

DETAILED DESCRIPTION OF PREFERRED EMBODIMENTS

The following examples and drawings are given for illustration purposes only. The invention is not limited by these examples but only by the appended claims. The various parts of the system can have various properties or be embodied in various ways. Each variant of each part of the system may be combined with each variant of any other parts of the system, unless explicitly mentioned otherwise.

The drawings are schematic and not drawn to scale. Some elements of the system are not illustrated, such as for example: elements for assembling the various parts together (flanges, screws, etc.), elements for properly ensuring sealing of various compartments (seals, etc.), or elements for controlling the system (wires, sensors, actuators, valves, safety devices, etc.).

FIG. 1 is discussed above in relation to the background art.

FIG. 2 shows a system of the invention in the two extreme positions of the system.

In a step (a) of heating, infrared lights 6' of a heating assembly 6 are positioned in an operative position between two tools 2, 4 holding the workpieces 10, 12. The heating assembly 6 can be as such substantially similar to the known heating assembly of FIG. 1.

A connection rod 14 connects kinematically the upper tool 4 to the heating assembly 6. The rod 14 is engaged in a pivoting manner with the upper tool 4 at a first pivot joint 14.1 and is engaged in a pivoting manner with the heating assembly 6 at a second pivot joint 14.2.

An actuator, materialized by arrow A can be provided to move the upper tool 4 downwards. Alternatively, the actuator is materialized by the arrow B and moves the heating assembly 6 transversally. In both cases, due to the connecting rod 14, the actuator moves simultaneously both the upper tool and the heating assembly.

Once the workpieces 10, 12 are heated to their melting or decompacting point, the actuator is operated to simultaneously move the lamps transversally away and move the upper tool 4 downwards so that the workpieces 10, 12 contact each other.

The bottom portion of FIG. 2 shows the system 1 in a final position.

The lower tool 2 is supported by springs 16 on a fixed platform 17. The springs 16 are chosen to have a predetermined stiffness, so that the pressure exerted by the upper tool 4 on the interface between the two workpieces 10, 12 does not exceed a predetermined amount.

A stopper 18 can be foreseen to stop the vertical movement of the upper tool 4 so that the path of the upper tool and hence the final geometry of the weld joint is controlled.

In addition, a damper 20 can be arranged to slow down the movement of the heating assembly 6 (and upper tool) before or after the workpieces 10, 12 contact each other. The heating assembly can comprise fragile elements (lamps) and dampening the movement may avoid any failure due to an abrupt stop.

The application targets specifically welding joints of two workpieces which are at least partly flat in the vicinity of the weld joint. For instance, FIG. 2 illustrates a reinforcing rib 10 to be welded to a skin. The invention is however not limited to this particular example and can be adapted to various types or various geometries of weld bead.

Also, the skilled person would understand from the teaching of this application that the invention can be carried out with alternative heating means (not infrared), and for other materials than carbon-reinforced thermoplastics.

The invention claimed is:

1. A system for infrared welding a first workpiece made of carbon-fiber reinforced thermoplastic polymers (CFRTP) to a second workpiece made of CFRTP, the system comprising:

an upper tool, for holding the first workpiece, wherein the upper tool is movable in a vertical direction;

a lower tool, for holding the second workpiece;

a heating assembly comprising infrared heating means and configured to move in a transverse direction between an operative position where the heating means can simultaneously heat a respective portion of the first workpiece and of the second workpiece, and a resting position; and a mechanism configured for moving synchronously the upper tool and the heating assembly, the mechanism comprising:

a mechanical connection connecting the upper tool to the heating assembly; and an actuator acting directly on one of the upper tool or the heating assembly, whereas the other one of the upper tool or the heating assembly is moved via the mechanical connection.

2. The system according to claim 1, wherein the system further comprises springs to support the lower tool in a vertically movable manner on a vertically fixed support.

3. The system according to claim 1, wherein the system comprises a stopper for interrupting the downward movement of the upper tool.

4. The system according to claim 1, wherein the system comprises a damper for dampening the movement of the heating assembly.

5. The system according to claim 1, wherein the mechanical connection is a rod which forms a pivot connection with the upper tool as well as a pivot connection with the heating assembly.

6. A method for infrared welding a first workpiece made of carbon-fiber reinforced thermoplastic polymers (CFRTP) to a second workpiece made of CFRTP, the method being carried out with a system comprising: an upper tool, for holding the first workpiece, wherein the upper tool is movable in a vertical direction; a lower tool, for holding the second workpiece; a heating assembly comprising infrared heating means and configured to move in a transverse direction between an operative position where the heating means can simultaneously heat a respective portion of the first workpiece and of the second workpiece, and a resting position; and a mechanism configured for moving synchronously the upper tool and the heating assembly, the mechanism comprising: a mechanical connection connecting the upper tool to the heating assembly; and an actuator acting directly on one of the upper tool or the heating assembly, whereas the other one of the upper tool or the heating assembly is moved via the mechanical connection, the method comprising:

heating a respective portion of the first and second workpieces with the infrared heating assembly;

synchronously moving:

the heating assembly transversally; and the upper tool downwardly.

7. The method according to claim 6, wherein the system further comprises springs to support the lower tool in a vertically movable manner, such that the welding pressure between the two workpieces resulting from the downward movement of the upper tool is limited by the springs.

8. The method according to claim 6, wherein the system comprises a stopper and the movement of the heating assembly and of the upper tool stops simultaneously when the upper tool contacts the stopper during its downward motion.

9. The method according to claim 6, wherein the system comprises a damper and the movement of the heating assembly and of the upper tool is dampened by the damper.

* * * * *